(12) United States Patent
Hodge

(10) Patent No.: US 6,824,183 B1
(45) Date of Patent: Nov. 30, 2004

(54) MODIFIED TAILGATE

(75) Inventor: William O. Hodge, Mobile, AL (US)

(73) Assignee: William Hodge, Mobile, AL (US)

( * ) Notice: Subject to any disclaimer, the term of this patent is extended or adjusted under 35 U.S.C. 154(b) by 0 days.

(21) Appl. No.: 10/361,958

(22) Filed: Feb. 10, 2003

Related U.S. Application Data

(63) Continuation-in-part of application No. 09/840,319, filed on Apr. 23, 2001, now abandoned, and a continuation-in-part of application No. 09/304,184, filed on May 3, 1999, now Pat. No. 6,224,127, and a continuation-in-part of application No. 09/041,070, filed on Mar. 10, 1998, now abandoned.

(60) Provisional application No. 60/089,797, filed on Jun. 18, 1998.

(51) Int. Cl.[7] .............................................. B62D 33/03
(52) U.S. Cl. ....................... 296/26.11; 296/57.1; 108/44
(58) Field of Search ........................... 296/26.09–26.11, 296/57.1; 108/44

(56) References Cited

U.S. PATENT DOCUMENTS

| | | | | |
|---|---|---|---|---|
| 2,606,786 A | * | 8/1952 | Howard | 296/61 |
| 4,993,088 A | * | 2/1991 | Chudik | 5/118 |
| 5,169,202 A | * | 12/1992 | Cupp et al. | 296/51 |
| 5,328,225 A | * | 7/1994 | Melching et al. | 296/26.11 |
| 5,649,731 A | * | 7/1997 | Tognetti | 296/26.09 |
| 5,752,800 A | * | 5/1998 | Brincks et al. | 414/537 |
| 6,065,792 A | * | 5/2000 | Sciullo et al. | 296/26.09 |
| 6,193,294 B1 | * | 2/2001 | Disner et al. | 296/26.11 |

* cited by examiner

*Primary Examiner*—Dennis H. Pedder

(57) ABSTRACT

A panel or cutting table which is preferably substituted for the tailgate for holding a cuttable item to be worked on and for mounting a tool having a blade and for supporting a cuttable item said device being attachable to a vehicle resting on the ground with an extendable central frame which may be reduced in size to be approximately the size of the panel or tailgate replaced and defining a holding mechanism for holding a saw and other tools so that the tools may be rotated to give the proper cut and also having an aligning rule to control the angle of the blade relative to a second aligning rule which holds the item to be cut square. In addition, the panel has a pair of legs capable of receiving two by fours so that a saw horse is provided. Finally, a scaffolding framework is described so that the panel may be used on hot days with a covering.

3 Claims, 18 Drawing Sheets

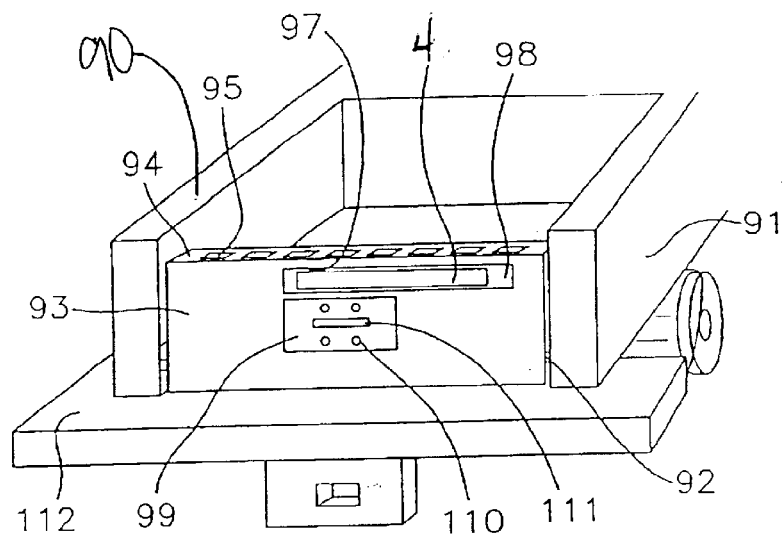
Fig. 12-A
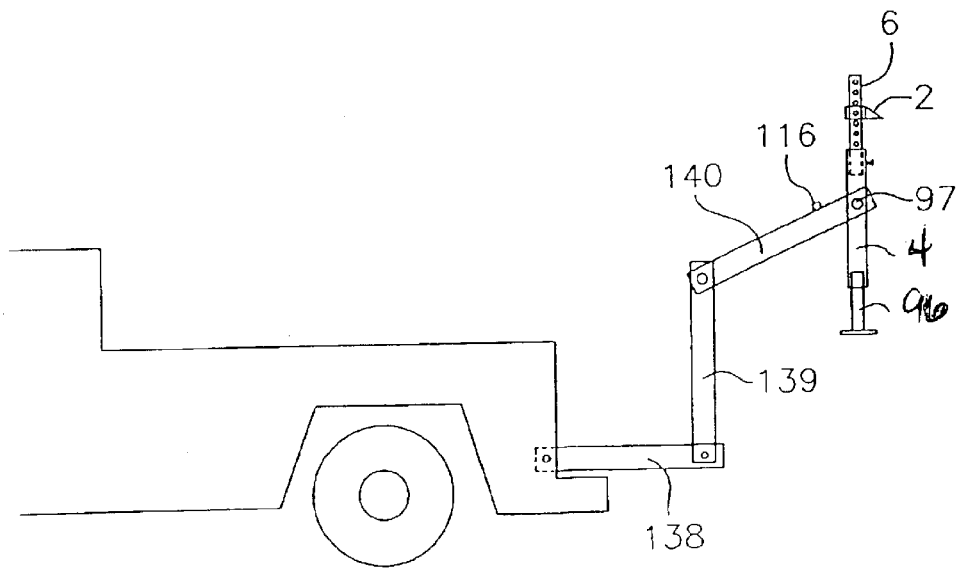
Fig. 18

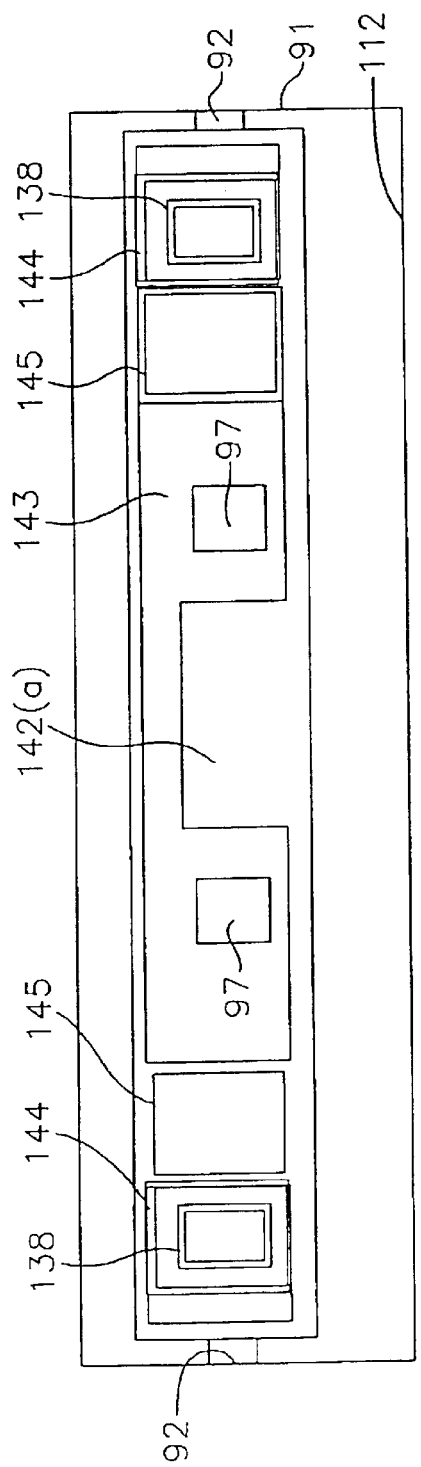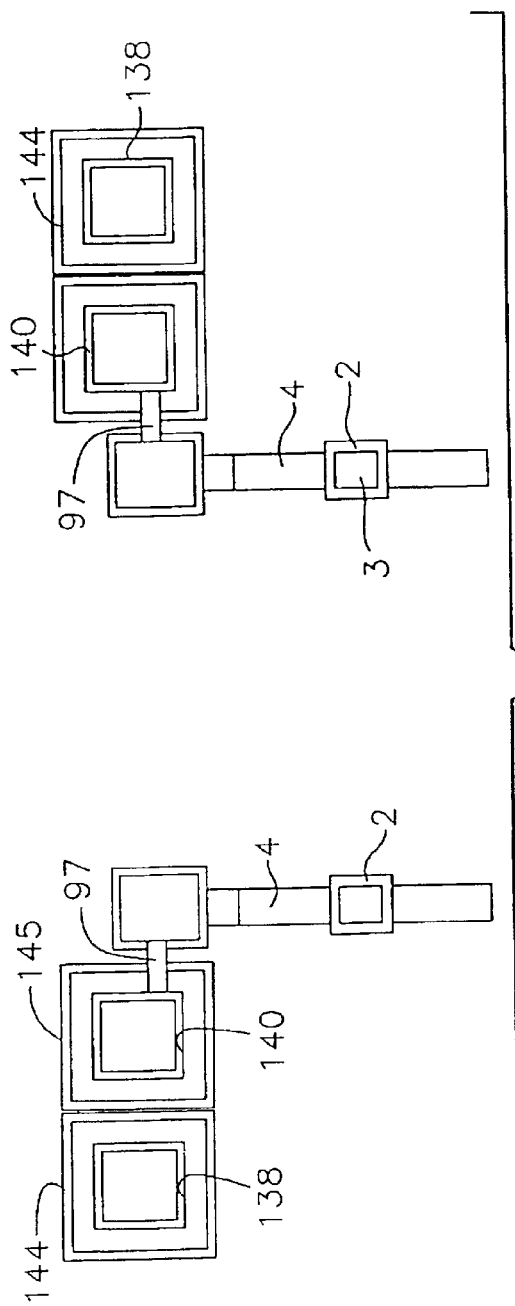

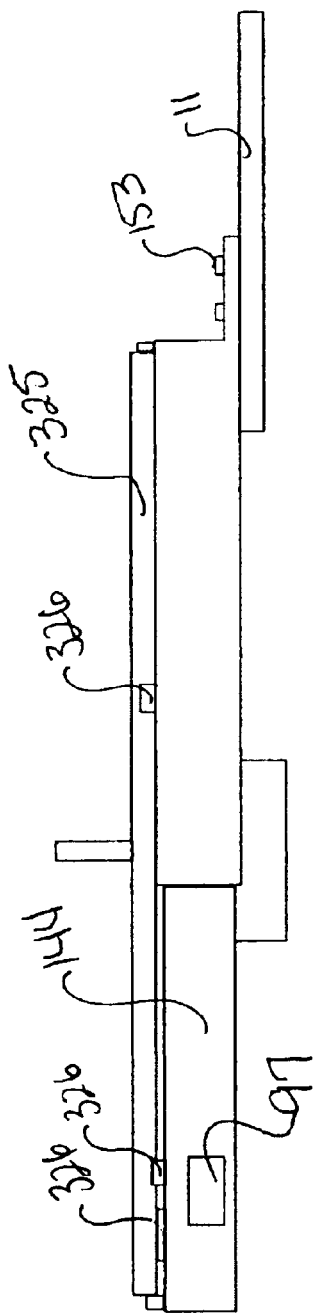
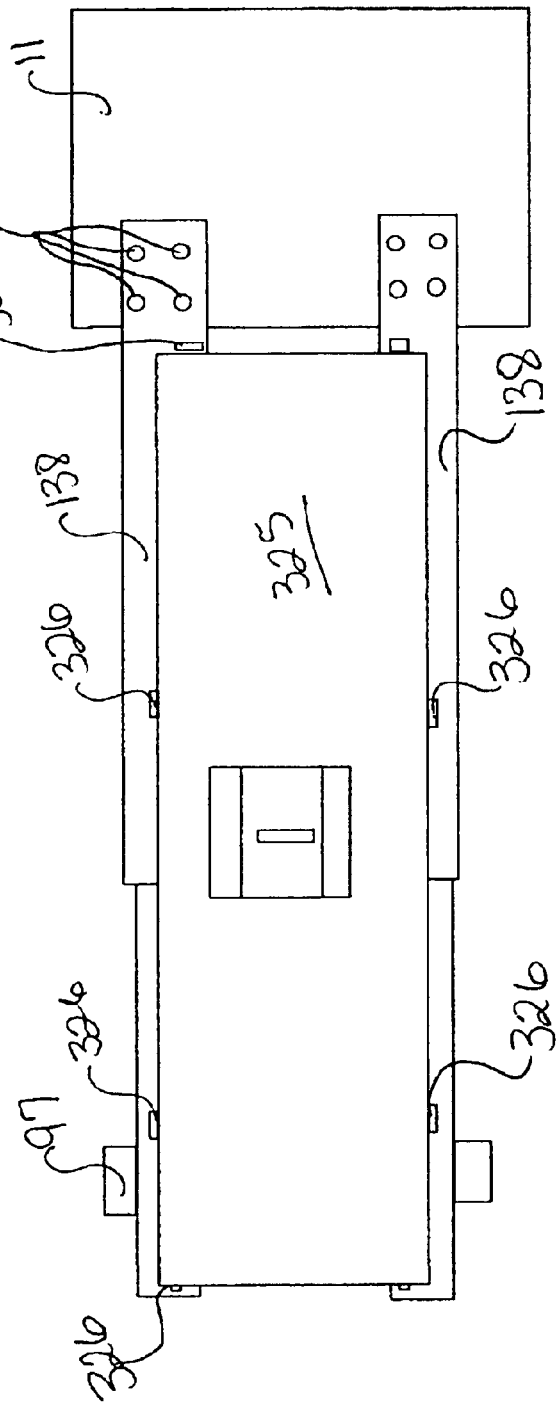
Figure 25
Figure 26

MODIFIED TAILGATE

This patent is a continuation in part of utility application Ser. No. 09/041,070, filed Mar. 10, 1998, now abandoned and utility application Ser. No. 09/304,184, filed May 3, 1999, now U.S. Pat. No. 6,224,127 which claims the benefit of U.S. provisional application 60/089,797, filed Jun. 18, 1998, and utility application Ser. No. 09/840,319, filed Apr. 23, 2001, now abandoned.

BACKGROUND OF THE INVENTION

The present invention related to a saw horse type cutting surface. More particularly, the present invention relates to a cutting surface mountable to a vertical surface.

PRIOR ART invention also allows for the incorporation of two spaced sawhorses. The prior art does not suggest a saw horse which can fit over the raised sides of a tailgate or rear panel of a flat bed truck. The saw horses provide a bracket for holding the cutting surface so that the exposed ends are held parallel for cutting.

A saw horse cutting surface is a surface which comprises at least two lengths of material (cuttable material such as wood) spaced at a desired distance, each being on approximately the same level from the ground level on which a piece of work (such as a length of wood) may be placed for cutting.

The prior art shows several surfaces attachable to the rear of a vehicle. The present invention differs by providing a holder for a cutting surface, and in particular parallel cutting surfaces so that they may be used in the same manner as a conventional saw horse mounted on a tailgate.

| PATENT NO. | TITLE | INVENTOR | DATE |
|---|---|---|---|
| 5,090,335 | TABLE FOR TRUCK BED | Kenneth R. Russell | Feb. 25, 1992 |
| 4,951,991 | TELESCOPING TRUCK BED EXTENSION | Dale C. Haigler | Aug. 28, 1990 |
| 4,705,254 | ADJUSTABLE AND REMOVABLE VICE STAND ASSEMBLY FOR MOTOR VEHICLES | Mark G. Swanson | Nov. 10, 1987 |
| 4,029,245 | AUTOMOBILE MATERIAL CARRIER | David L. Berlin | Jun. 14, 1977 |
| 1,756,629 | EXTENDIBLE VISE SUPPORT | A. W. Campbell | Apr. 29, 1930 |
| 5-319164 | (JAPAN) WORKING VEHICLE MOUNTED WITH LONG ARTICLE WORKING | Akihiro Murakami | Dec. 3, 1993 |
| 1-282040 | (JAPAN) RECEIVING TABLE DEVICE FOR VEHICLE | Ryosuke Okawa | Nov. 13, 1989 |
| 2,468,579 | EXTENSIBLE LOAD-SUPPORTING MEANS FOR TRUCKS | H. Vuori | Apr. 26, 1949 |
| 5,451,088 | COMBINATION FRAME-SUPPORT BOX RECEIVING & SELF-STABILIZING BED EXT. | Robert L. Broad | Sep. 19, 1995 |
| 5,433,566 | TAILGATE-MOUNTED STABILIZING APPARATUS | Douglas B. Bradley | Jul. 18, 1995 |
| 5,267,748 | VEHICLE TOOL PLATFORM APPARATUS AND METHOD | Charles F. Curran | Dec. 7, 1993 |
| 5,533,771 | MULTIPLE PURPOSE TRUCK TAILGATE APPARATUS | Shepard Taylor; Seabrook Taylor | Jul. 9, 1996 |
| 5,458,389 | DEVICE FOR EXTENDING THE BED OF A TRANSPORT VEHICLE | Freddie W. Young | Oct. 17, 1995 |
| 5,575,521 | TAILGATE BOX, TABLE, AND SINK | Gregory D. Speis | Nov. 19, 1996 |
| 4,846,385 | LOCKABLE MOUNTING BRACKET FOR CHAIN SAWS | William W. Frantus | Jul. 11, 1989 |
| 4,727,777 | VEHICLE-MOUNTED SUPPORT FOR SHARPENING CHAIN SAWS | John Obester | Mar. 1, 1988 |
| 5,007,568 | TRUCK SIDEWALL MOUNTED CHAIN SAW CARRIER | Jimmy C. Da Vault | Apr. 16, 1991 |
| 5,010,978 | APPARATUS AND METHOD FOR A SAWING STAND | Scott A. Jimmerson | Apr. 30, 1991 |
| 5,490,649 | DEVISE FOR MOUNTING, SECURING AND SUPPORTING PORTABLE POWER TOOLS HAVING BED EXTENSION ASSEMBLIES | Louis N. Kusalich | Feb. 13, 1996 |
| 5,267,748 | VEHICLE TOOL PLATFORM APPARATUS AND METHOD | Charles F. Curran | Dec. 7, 1993 |
| 4,025,014 | STORAGE HOOK | Charles O. Larson | May 24, 1977 |
| 2,291,381 | DISPLAY FIXTURE | C. E. Drake | Mar. 3, 1941 |
| 1,593,722 | FASTENING DEVICE FOR GUN TOOLS | B. P. Joyce | Jul. 27, 1926 |

RELATED ART

The prior art as exemplified by the other patents show various platforms which can be mounted to the flat bed of a truck. The present invention relates to saw holders which are shown mounted either to the bumper or in the bed of a truck for holding saws.

None of these prior art references provide for a work surface which allows for a saw table supported in place of or as an attachment to the bed or tailgate of the truck. The present invention provides a transportable saw horse, which may be attached to a vehicle, preferably the tail gate of a vehicle. Other art, such as U.S. Pat. No. , 5,267,748, utilizes the rear tail gate hitch having a single tool platform to which a work tool may be secured.

The prior art does not describe two parallel cutting surfaces supported by a vehicle for use as cutting surfaces.

GENERAL DESCRIPTION OF THE PREFERRED EMBODIMENT

The invention described herein is a device for holding a cuttable item to be worked on and for mounting a tool having a blade. The cuttable item is supported by the attached device attached to a vehicle resting on the ground. The vehicle has a vehicle frame having a left panel and right panel with a top and bottom. The device has a central frame having a left side and right side, a top and a bottom, an inside and outside defining a central framing opening. The central frame defines a frame surface for holding material and the central frame further defines a tool holding means for holding the tool. The tool holding means may hold a saw, a drill press, a jig saw or other similar tool.

Preferably, where a saw blade is held to work on the item to be cut, the saw blade can be angled in any direction by having it rotationally mounted or by having it mounted so it can tilt. In addition to a saw blade it may have built in or added clamps to hold wood being worked on in place.

The central frame is rotationally attached at the left side and right side to the vehicle. For a truck, this would be in place of the tailgate (when the central frame is raised) between the left panel and right panel so it may be lowered with the outside facing the ground (when lowered to be used as a saw table).

The central frame is rotationally attached to the bottom of the left panel and the bottom of the right panel so it can rotate down.

Since the ground is uneven, the central frame may have an angle means for adjusting the angle at which the face surface is suspended above the ground. A part of this angle means may be the vehicle bumper below the left and right panels so that the bumper supports the central frame when it is rotated downward. Adjusted pads under the left and right side of the frame may serve to balance the sides. Legs with adjustable length may also be used.

Typically, the saw or other device has a motor and the central frame comprises a holding means for holding the motor on outside. In this way the motor of a saw is below the central frame when the blade is held above the cutting surface defined by the top of the central frame. The central frame defines a blade opening for allowing the blade of the tool to extend through the central frame to cut an object held on the frame surface.

For several purposes which will become clear, the central frame comprises a first portion attached to the surface of the vehicle, and at least one second portion extendably attached to the first portion so that the length of the frame surface may be extended. One reason is to allow the table to be longer than a normal tailgate, but retractable to be the same size as a tailgate.

There may be a locking means for fixing the position of the first portion relative to the at least one second portion. The first portion preferably defines slots and the at least one second portion defines beams which are extendable from within the first portion slots.

The second portion may, alternatively, be foldably attached to the first portion by way of pivots so that the second portion may fold out at the pivots from the first portion.

Since most tailgates are removable, the device is approximately the same size as the replaceable panel replaced when the beams are not extended.

The invention preferably comprises at least one third portion extendably attached to the at least one second portion. This may have a flat bar raised above the cutting surface to guide a straight edge of the article to be cut into proper position with the cutting blade. The central frame may also have a first measuring means for determining the distance between this flat bar and the blade of the tool used to cut the article to be cut. The central frame may hold the cuttable article square to the blade. It may also articulate to hold the article at a predetermined angle to the blade if the blade is fixed in place.

The first measuring means is preferably a ruled means showing the distance between the part and the blade to be cut. At least one alignment bar sizeably connected to the frame surface and a ruled scale between the alignment bar and the blade is preferable.

The alignment means may have a second alignment bar connected to the frame surface at an alignment angle to the at least one first alignment bar.

The leveling means comprises legs off either side of the cutting surface, the legs allow the central frame to be leveled relative to the ground even if the vehicle is not on a level surface. Leveling means preferably allows leveling up and down and left and right. The legs preferably comprise at least one leg for supporting one saw table central frame attached to the central frame on the left and right sides of the central frame and one on the side of the central frame opposite its attachment to the vehicle. The legs may be extendable.

The central frame may define a gap where the legs are pivotally attached to the central frame so that the legs can fold into the gap formed by the central frame.

In order to give the device even greater versatility, two parallel legs may include a holding device attached to the legs of the cutting table so described for holding a first cutting surface defining an enclosed portion and an exposed portion, and also for holding parallel to the first cutting surface a second cutting surface defining an enclosed portion and an exposed portion approximately parallel and above a standing surface. This is a saw table as shown in FIG. 1.

The holding device may include a first bracket means defining a first slot for receiving the first cutting surface enclosed portion so that the first cutting surface exposed portion extends outward and away from the vehicle interior and a second slot for receiving the second cutting surface enclosed portion so that the second cutting surface exposed portion extends outward and away from the vehicle interior approximately parallel to, but separated from said first cutting surface. In the preferred embodiment, the first cutting surface further comprises a wooden board having a top surface and an enclosed portion fitting within the slot and the exposed portion further comprises at least part of the board top surface. It is important that the height of the first bracket means is adjustable.

While the cutting tool is typically from the group comprised of a saw, a drill, a welder or a torch and the blade is from the group of a saw blade, a drill bit, a welding bit or a flame, the primary improvement of this over other technologies is to have a tool in place of a vehicle tailgate with a leveling means to hold the cutting surface and work surface parallel to the ground.

In the embodiment taught herein, the device has a power source having a switching means attached to the central frame allowing a user to provide or remove power to the tool. A foot switch is provided to add or remove power since the motor is shown below the cutting surface.

One purpose is to provide a) a central frame defining an opening for receiving a saw; b) a holding means for holding the saw within the space; c) at least one leg comprising: (I) a first bracket means defining a first slot for receiving the first cutting surface enclosed portion so that the first cutting surface exposed portion extends outward and away from the at least one central frame and a second slot for receiving the second cutting surface enclosed portion so that the second cutting surface-exposed portion extends outward and away from the central frame approximately parallel to, but separated from said first cutting surface, said bracket means being attachable to said attachment surface.

A further purpose is to provide a cutting surface attached to a vehicle having an interior and an exterior wall comprising the steps of:

a. attaching a first cutting surface, having an exposed surface to the exterior wall of the vehicle so that the cutting surface-exposed surface extends away from the vehicle interior;

b. attaching a second cutting surface, having an exposed surface to the exterior wall of the vehicle so that the cutting surface-exposed surface extends away from the vehicle interior parallel to the first cutting surface.

These and other objects of the invention will be better understood from an examination of the claims, the drawings and the detailed discussion of the preferred embodiment where parts are number with description set out in the preferred embodiment.

It is therefore an object of this invention, to provide for a portable saw horse which may be utilized wherever a raised wall is present.

It is further the object of this invention to provide a saw horse which may be mounted on the tailgate, receiving hitch or side of a pick-up truck.

It is further the object of this invention to provide a sturdy, stable surface for cutting in a variety of environments.

It is further to provide a portable surface which can be utilized as a mounting for a table, shade, scaffolding, table saw, drill or for other purposes consistent with the disclosure set out herein.

These and other objects and improvements of the invention will become more clear from the detail description of the preferred embodiment set forth below, as well as the figure, in which like parts have similar numbers.

BRIEF DESCRIPTION OF THE DRAWINGS

For a further understanding of the nature and objets of the present invention, reference should be made to the following detail description taken in conjunction with the accompanying drawings in which like parts are given like reference numerals and wherein:

FIG. 12a shows the saw table in the closed position from FIG. 12.

FIG. 18 shows an alternate embodiment of the version described in FIG. 14 where the first inside arms 138 is a part of the tailgate as opposed to having the first inside arms 138 being attached to the tailgate 11.

FIG. 19 shows a cross sectional view of the tailgate of FIG. 13 along a 19—19 axis.

FIG. 20 shows a cross section view along the 20—20 axis of the same drawings as FIG. 13.

FIG. 25 is a side view of a cover for a saw table attached to the tailgate.

FIG. 26 is a top view of the cover shown in FIG. 25.

DETAILED DESCRIPTION OF THE PREFERRED EMBODIMENT

Figure 12:
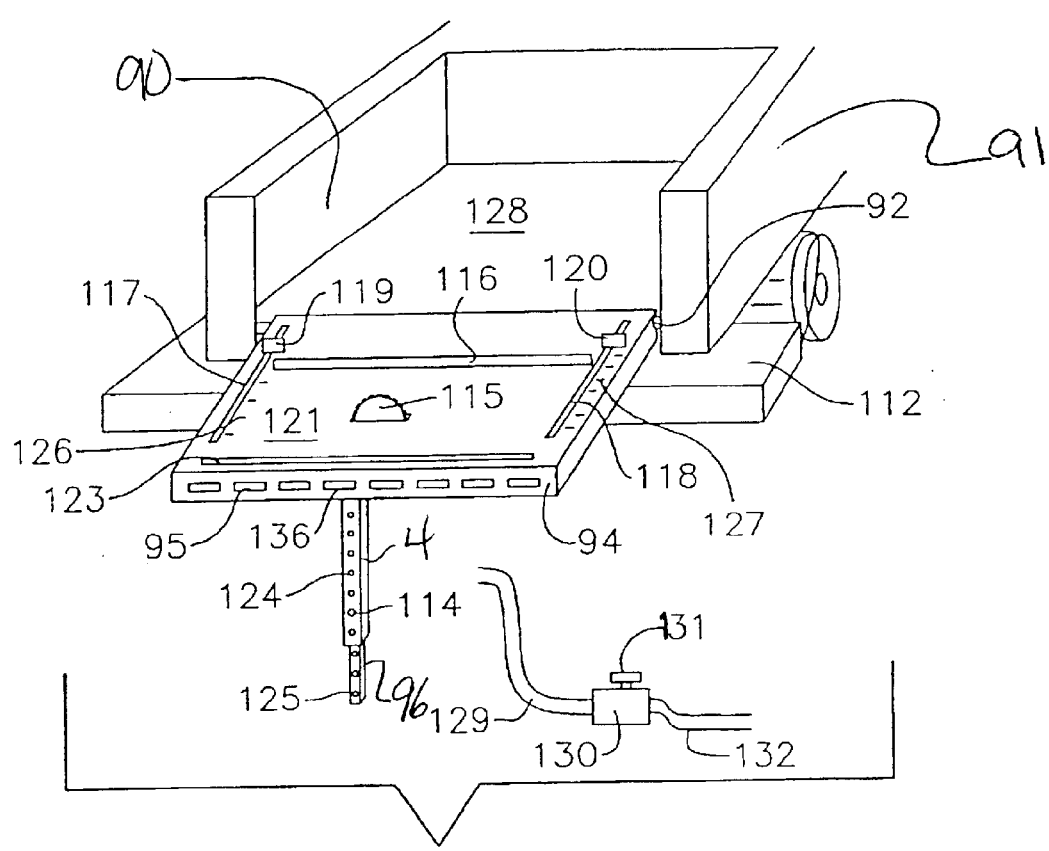
FIG. 12 shows the saw table which is claimed herein from a rear perspective view.

As can best be seen by reference to FIGS. 12 and 12a, the invention in its simplest embodiment comprises a cutting table 121 which is mounted by way of pivots 92 to the left side 90 and right side 91 of a truck in place of the tailgate using the pivots for the tailgate which is removable. The truck bed 128 will be approximately parallel with the surface formed by the cutting table 121.

The blade of a saw blade 115 comes up to an opening 111 in the mounting plate 99 which mounting plate defines bolt holes 110 through which the saw motor 137 (not shown in FIG. 15) may be mounted so that the blade 115 extends through the opening 111 above the surface of the table 121. In order to ensure that the material cut is held at the proper location relative to the saw blade, a first measuring guide 116 is held (removably or by attachment) between a left guide 119 and a right guide 116 which may be positioned at the desired location by way of guides 119 and 116. These guides 119 and 116 move the left slide groove 117 and the right slide groove 118 respectively. In order to make sure that they are aligned properly, measurements 126 for the left side and measurements 127 for the right side may be included. A top guide slide groove 123 is shown for positioning when necessary although no guide is shown in this embodiment, one could be added.

A power cord 129 for the tool (here motor 137)may go to a foot operated power control 130 which has a foot operated on/off switch 131 which may be connected to a power source through a power cord 132 to allow the tool to be operated while the user's hands are free.

As shown in this embodiment in FIG. 12*a* the tailgate 11 may act as a support for the saw table 93. The saw table 93 shown in FIG. 12*a* defines a support leg groove 98 (Shown in FIG. 12*a*) into which a support leg 96 is mounted by way of a hinge 97 so that it may be recessed when not in use as shown in FIG. 12*a* and may be extended as shown in FIG. 12 so as to hold the saw table 93 at the appropriate angle above the ground. The leg 4 and leg extension 96 defines holes 124 and 125 respectively so that a bolt 114 may be inserted through one of the holes 124 in the leg and one of the holes 125 in the leg extension thereby fixing the height of the leg relative to the leg extension. In this way the angle of the table 1 can be controlled.

Figure 13:
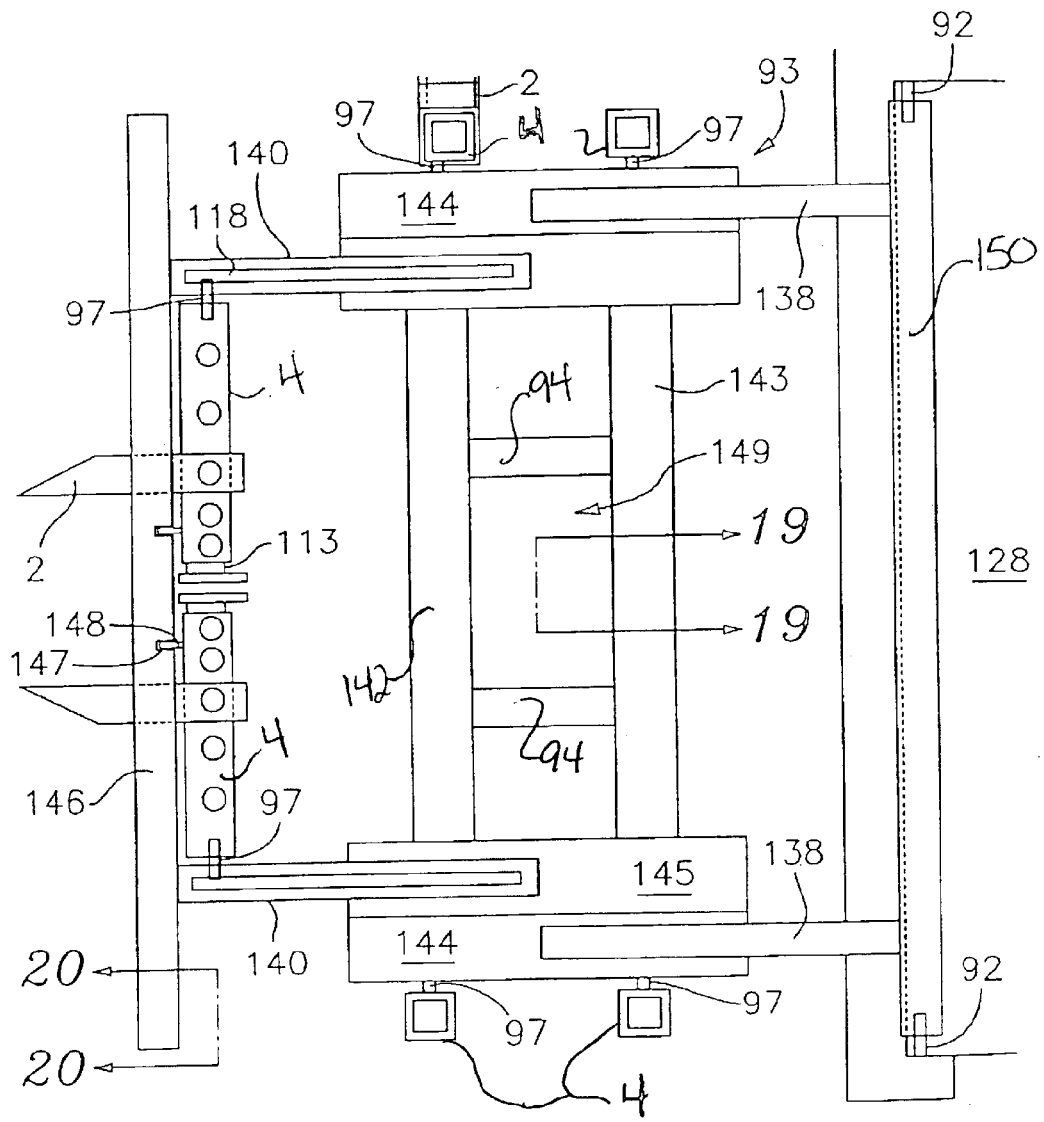
FIG. 13 shows a top view of an alternate embodiment of the saw table with a non-solid base defined by a frame.
Figure 14:
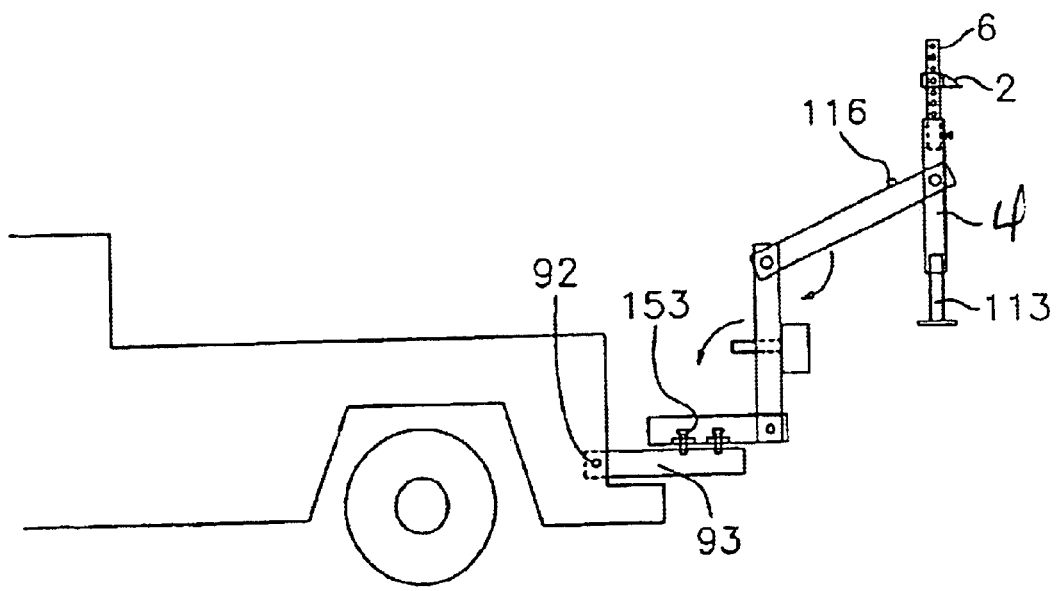
FIG. 14 shows an alternate method of folding and unfolding the saw table in a different embodiment.
Figure 24:
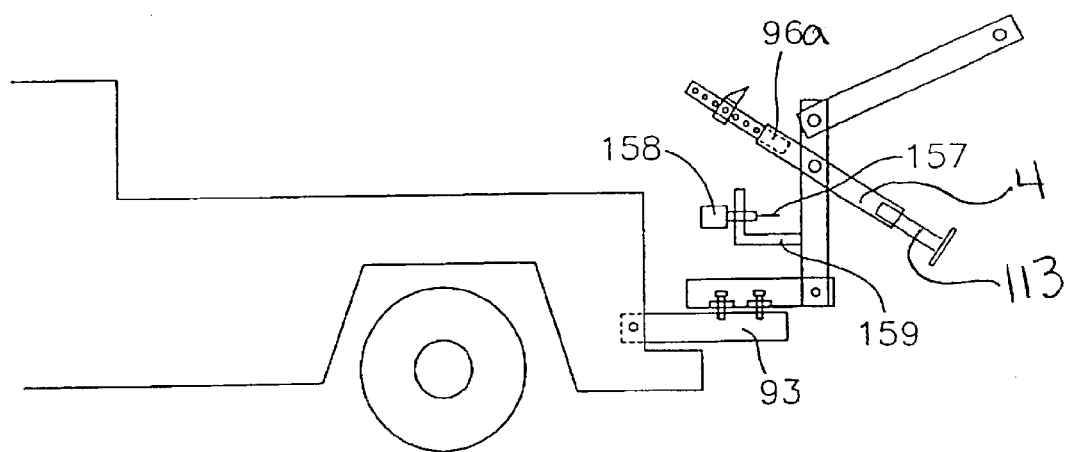
FIG. 24 shows an alternate embodiment of the unfolding version of the tailgate.

In one embodiment instead of having a solid table as shown in FIG. 12 and FIG. 12*a*, the table can be made of extending arms so that the table may fold up to be the size of a regular tailgate and later to be extended to be a longer saw table as shown in FIG. 13. An alternate embodiment of this is shown in FIG. 14, 18, and 24. A solid flat surface 325 may be added on top of the extended arms as shown in FIGS. 25 and 26. In this case there are raised guides 326 between which the surface 325 fits. Bolts 153 hold the first item 138 to the tailgate 11.

FIG. 18 shown how the first inside arms 138 consists of a tailgate (of the type shown in FIGS. 2 and 4) as opposed to having the first section replace the tailgate. The tailgate is replaced but any panel of the vehicle may also be replaced with such a modified tailgate since the device could be used in place of the two side panels 90 and 91. The tool may be a saw, a drill, a welder or a torch and the blade may be a saw blade, a drill bit, a welding bit or a flame. As can best be seen by reference to FIG. 12, the invention comprises a cutting table 1, which is substituted for the tailgate of a truck 27, for holding a cuttable item to be worked on and for mounting a tool having a blade and for supporting a cuttable item. FIG. 13 shows a frame 66 which may be reduced in size to be approximately the size of the panel or tailgate replaced comprised of items 138:144 and 145: and 140. A holding mechanism is present for holding a saw or other tools so that the tools may be rotated to give the proper cut. An aligning rule allows control of the angle of the blade as it holds the item to be cut square.

As shown in FIG. 13, there may be a securing bar 150 held on either side by pivots 92 mounted on the left and right side panels 90 and 91 respectively. From this securing bar 150 extends first inside arms 138. These are spaced to provide for an opening 149 between brace arms 94 and arms 143 on the left and right side. First telescoping arms 144 extend on the left and right side from the first inside arms 138. Adapting sections 145 receive the second sections 140 on the left and right side allowing those to extend from first telescoping arms 144.

The first telescoping arm 144 has hinges 97 on either side which may receive supports 4 which supports may hold brackets 2 which may function as sawhorses. In FIG. 13 it can be seen that these supports 4 may pivot to the down position. Supports 4 are shown which pivot downward from the arm 144. These supports 4 attached to the section 140 are in the raised position so that the function can be observed. In this way sawhorses and a saw table are provided as a single unit in place of the vehicle.

The supports 4 may pivot up when not needed to allow the telescoping second section 140 to function as a guide. It can be seen that the sawhorse supports 4 may pivot upward so that they are at a higher level and may pivot downward so that they are a lower level merely be reversing the position of the brackets 2 or by providing that the brackets 2 can hold wood whether the legs are in the up or down position. At the very end of section 140 is a measuring bar 146 which is raised slightly above the surface of the second section 140, first telescoping section 144, and the first inside arms 138 which are preferably all designed to hold a piece of wood to be cut at the same height, the purpose of this is to allow for the position of the wood to be cut to be held square or with another angle relative to opening 149 where the blade appears to be controlled and aligned by the movement and angle of the measuring bar 146.

FIG. 14 shows an alternate method of accomplishing this where the first inside arms 138 are bolted to the existing tailgate 11. The first telescoping section 144 is attached to the first inside arms 138 and folds up nd out. The second section 140 is attached to the rear of the 144 and folds up and out so that the sawhorse may be extended. It can be seen that a folding section shown in FIG. 14 could be combined with a sliding section as shown in FIG. 13.

The view in FIG. 14 shows the first inside arms 138 being attached by way of bolts 153 to the existing tailgate 11 of the truck. This also shows a side view of one of two sawhorse supports 4 with an extension 113 adjustably connected to the support 4 to allow for the adjustment of the height of the cutting surface. An upper leg extension 6 holds the sawhorse holding bracket 2 at various locations above the top of the cutting table formed by inside arms 138, first section 144 and second section 140. FIG. 14 shows a side view showing the motor 137 and the blade 115.

Figure 16:
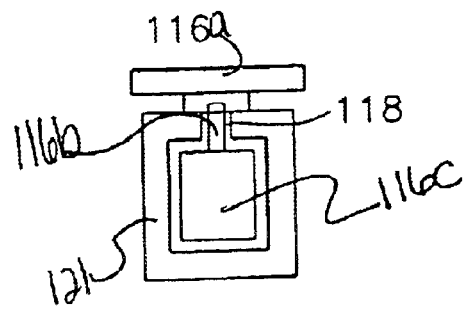
FIG. 16 shows how the groove 118 holds the right guide 116 by way of a cross sectional view showing the movement of this guide 116 within the groove 118 to allow its position to be adjusted.

FIG. 16 shows a cross section of the groove 118 which hold the right guide 116 showing the movement of this guide 116 within the groove 118 to allow its position to be adjusted. The top 116*a* may screw down onto the arm 1δ 6*b* of the bottom 116*c* of the guide 116 to tighten it in place.

Figure 17:
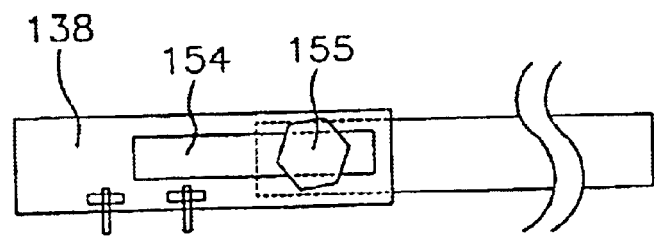
FIG. 17 shows the locking mechanism for the extension of the saw table.

FIG. 17 shows inside arm 138 and first telescoping section 144 extending from inside section 138. A groove 154 in inside arm 138 receives a bolt 155 which also pushes through hole 154 to fix the position of inside arm 138 to first telescoping section 144 so that the length of the saw table can be adjusted. A nut sliding inside of the groove 154 may tighten against the bolt 155 to fix the inside arm 138 and section 144.

Figure 15:
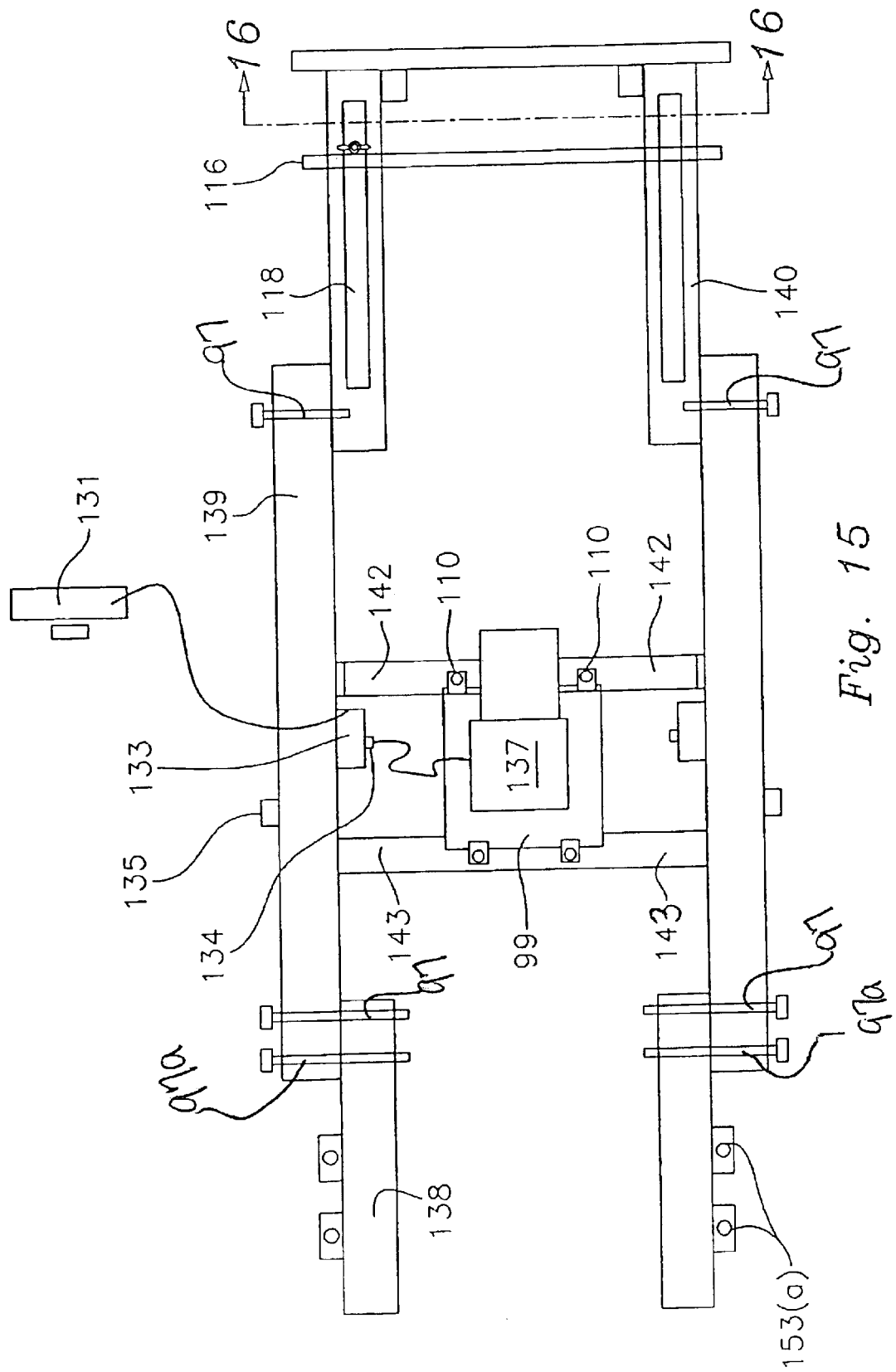
FIG. 15 shows an extended view of and alternate embodiment of the saw table shown in FIG. 13.
Figure 23:
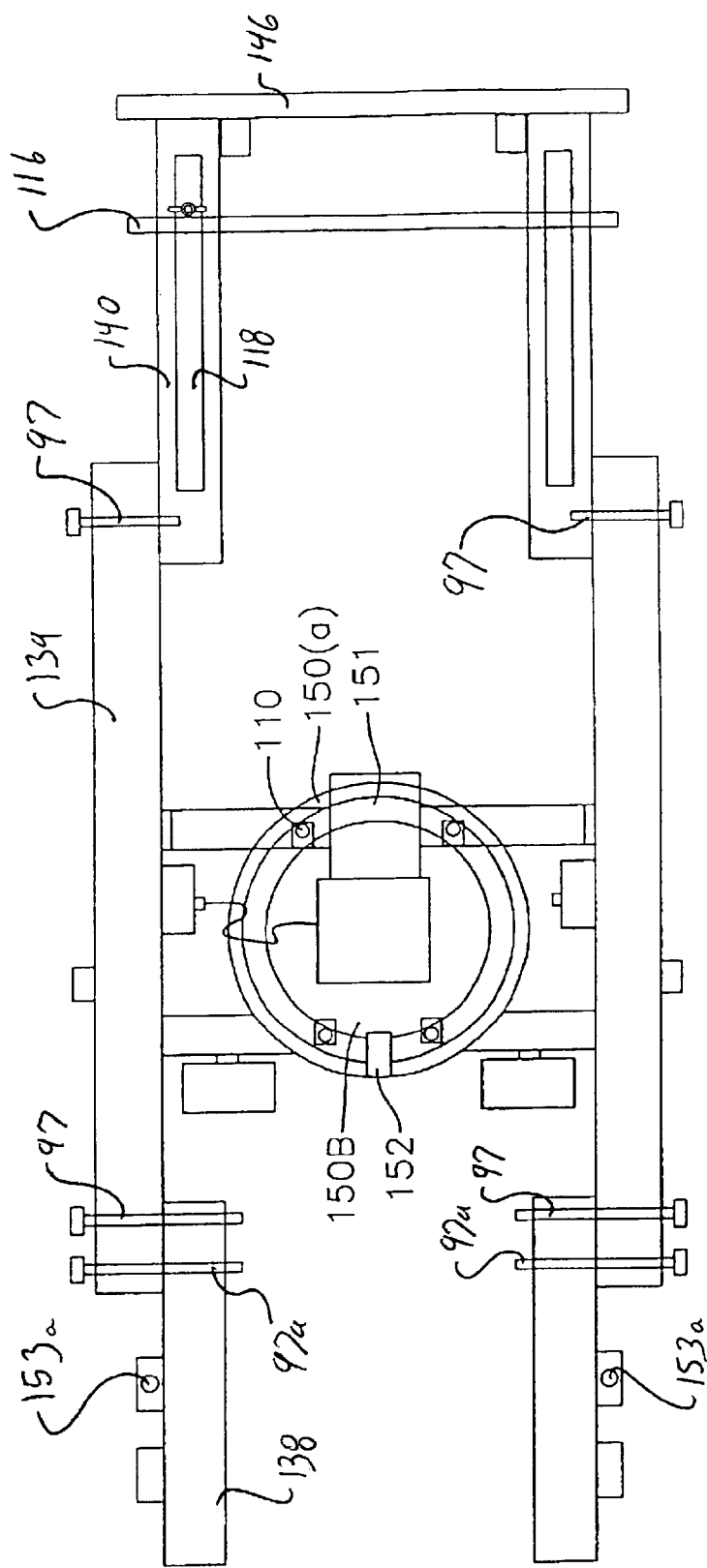
FIG. 23 shows a top view of an alternate embodiment with a rotating blade holding mechanism.

As shown in FIGS. 14 and 15 there is a first telescoping section 144 pivoting around hinges 97 and second section 140 pivoting around hinges 97 allowing each of the parts to pivot out relative to one another. FIG. 23 shows two bolts 97 which would allot for the position of two of the items (here 138 and 139) to be fixed relative to one another. Here a single guide 116 is adjustable along a groove 118 in the second section 140 to allow for alignment of wood to be cut aligned relative to the cutting tool.

As shown in FIG. 12*a* are the holes 110 (or other mounting means) whereby the saw(shown in FIG. 15) may be mounted to the tailgate 11.

FIG. 15 shows how to the motor 137 may be mounted to arms 142 and 143. Hole 110 can receive bolts 210 which are shown exploded out in FIG. 14. A plug 134 from the motor 137 may plug into plug box 133 from which a foot actuated power control 130 may extend. There may also be a power plug 134 for other uses provided along the extension 139.

FIG. 19 shows how the parts may cooperate. This cross section view shows that one section may slide in and out from the another section.

FIG. 20 shows how the sawhorse primary supports 4 may extend downward from second section 140 in order to utilize the sawhorse brackets 2.

Figure 21:
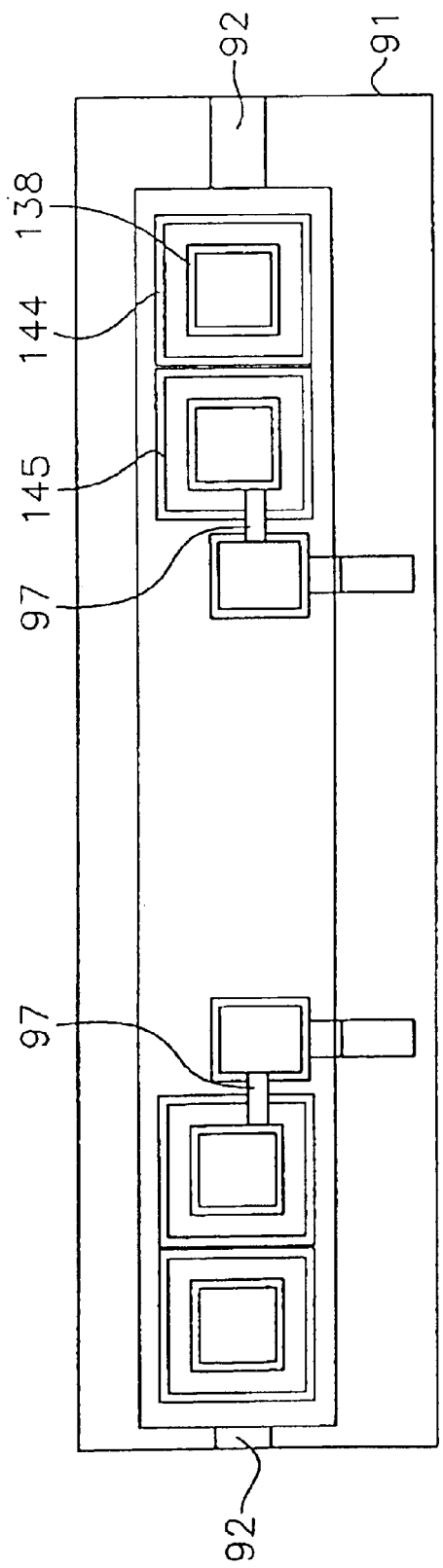
FIG. 21 shows a cross section view along the 21—21 axis of the same drawings as FIG. 13.
Figure 22:
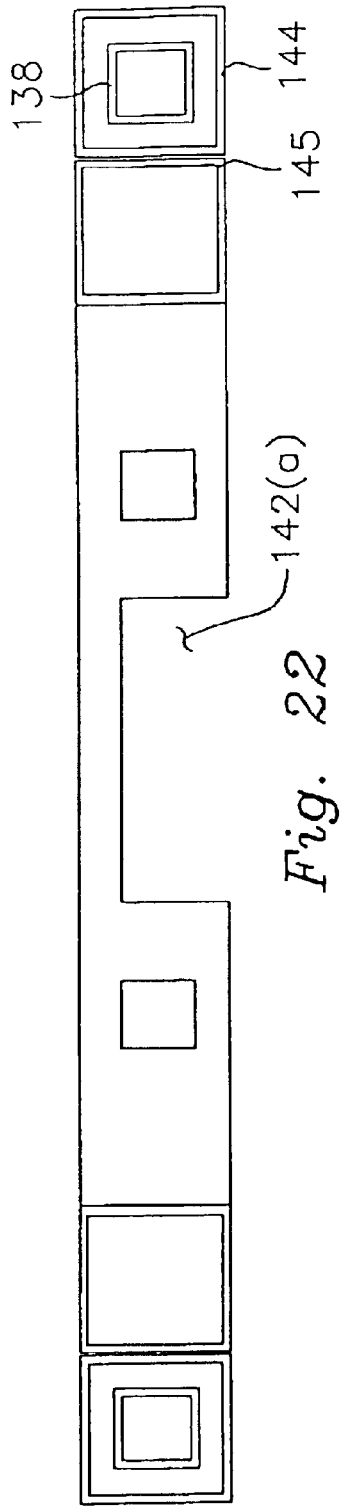
FIG. 22 shows a front view of the middle section from FIG. 13.

FIGS. 21 and 22 show alternate views showing the interlocking portions that would slide relative to one another. Preferably sections 144 would have an inner diameter equal to the outer diameter of inside arms 138 and the outer diameter of second section 140 would be equal to the inner diameter of section 145.

In order to allow the saw blade (not shown in this view) to turn. FIG. 23 shows an alternative method of holding the saw motor where the mounting plate is held by bolts 10 going through a rotating support so that the motor may be rotated so that the blade may present a different angle. Here first plate 150(b) turns within second plate 150(a)

FIG. 24 shows how a drill having a motor 158 and a drill bit may be mounted on an arm 159 in the manner previously known for drill presses teaching generally that tools may be held above the opening 149 described between the arms 143 and 142.

Figure 27:
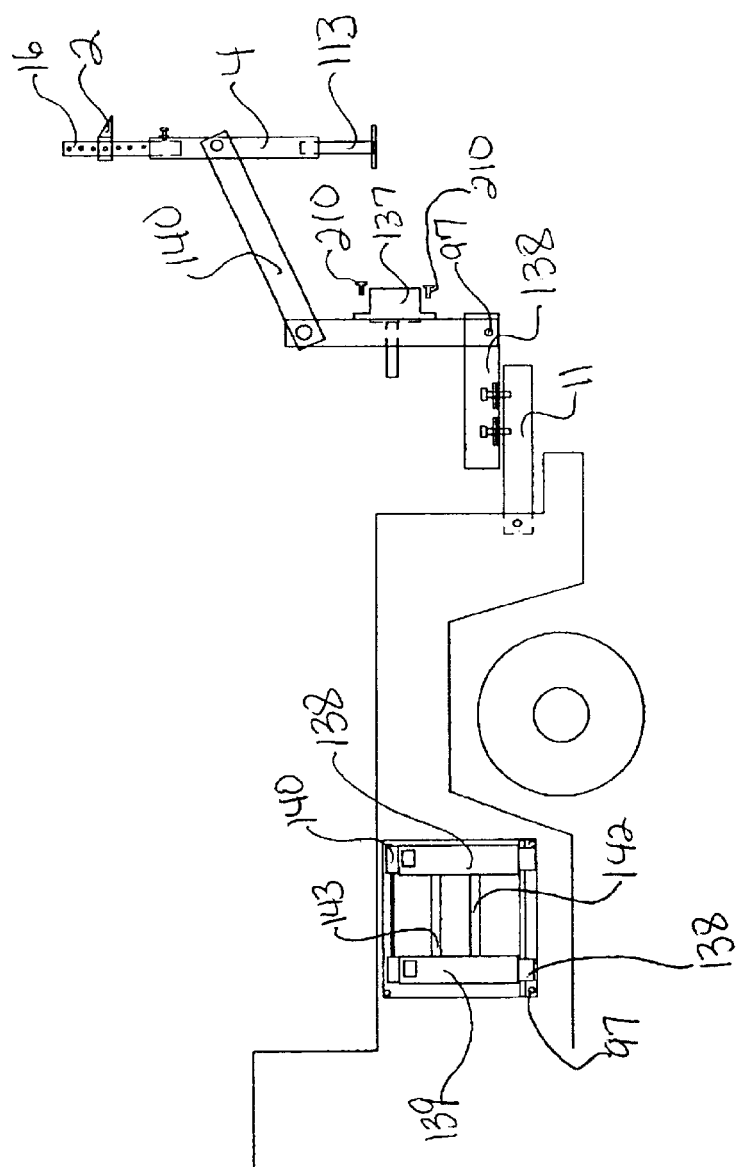
FIG. 27 shows a truck having a side tailgate panel as well as a tailgate panel.

FIG. 27 shows a truck having a side tailgate panel (which could also be mounted on the front) as well as a tailgate panel. The rear panel has a inside arms 138 mounted to the tailgate 11 from which extends the extension 139 and the second section 140. The bolts 210 holding the motor 137 to the extension 139 are also shown exploded out in this view.

On the left side of the vehicle, a panel has been mounted comprising a hinge 97 from which pivot down inside arms 138 which receive extension 139 from which extends second section 140.

Figure 28:
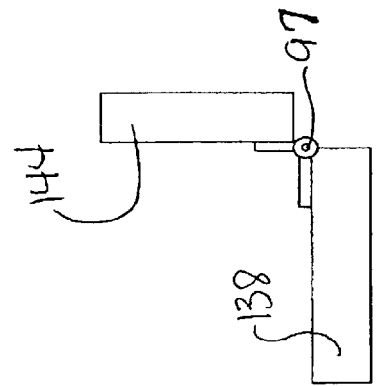
FIG. 28 shows a detail view of a different hinge arrangement for extending the length of the tailgate.

FIG. 28 shows a detail view of a different hinge arrangement for extending the length of the tailgate where the hinge 97 allows sections (here 138 and 144) to fold or stack together.

Figure 9:
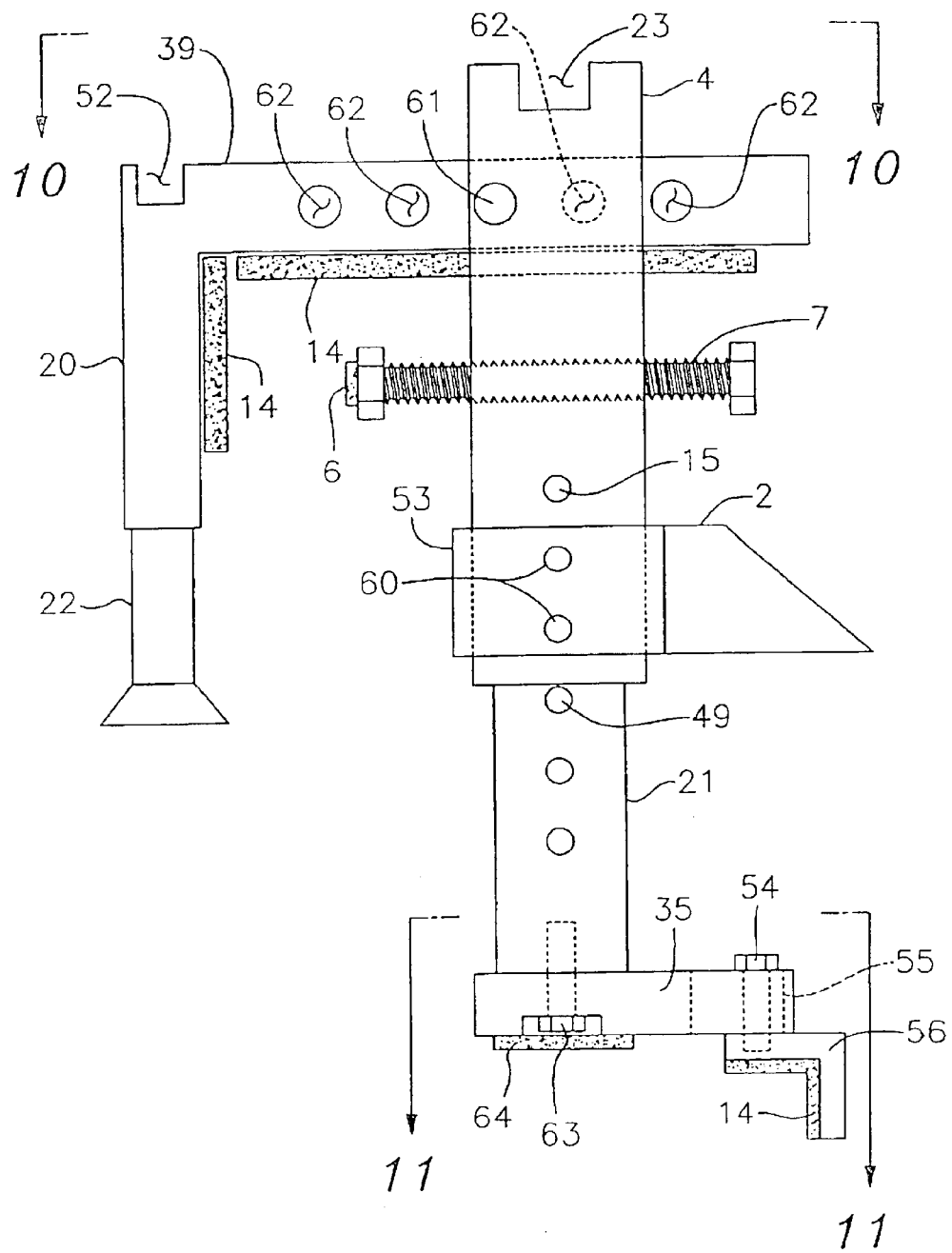
FIG. 9 shows a modification to receiving scaffolding present on the embodiment shown in FIG. 1.

The saw horse can be seen by reference to FIG. 9. The invention comprises a bracket means for holding a cutting surface. The cutting surface 1 is preferably a wooden two by four.

The bracket means is preferably a bracket 2 held by a support means, here two legs, a first primary support 4 and a secondary leg 20. These are connected by atop leg 239. Each of the two bracket means comprises a primary support 4, a secondary leg 20 and a top leg 239 which here, is a welded integral part of the secondary leg 20. Pads 14 may be provided to ease the contact between the legs and the vehicle tailgate (shown in FIG. 1).

Figure 10:
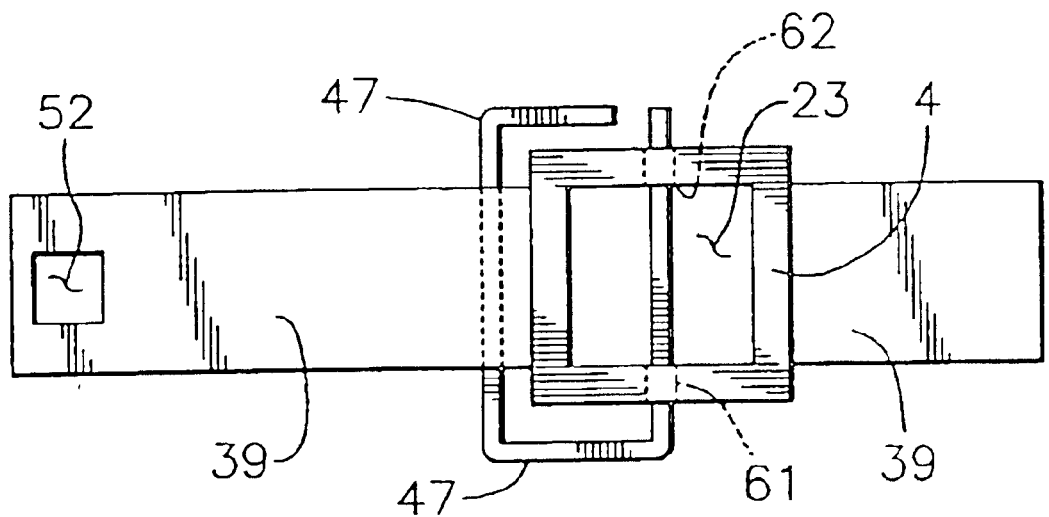
FIG. 10 is a detail view from the top of FIG. 9.

The primary support 4 has primary support holes 18 capable of receiving a straight or locking pin 47. An example of a locking pin is shown in FIG. 10. A primary support extension 21 allows for the length of the primary support 4 to be extended. The primary support extension 21 fits within the primary support 4 and has holes 49 which may also receive a locking pin 47 to fix the length of the extension 21. A base plate 35 has a L-clamp 56 attached to the base plate 35 which can hold the device to a vehicle bumper 9. The base plate 35 is secured to the primary support extension 21 by a countersunk pin 63 and may have a pad 64 over the base plate 35 to even out the height relative to the L-clamp 56.

Figure 1:
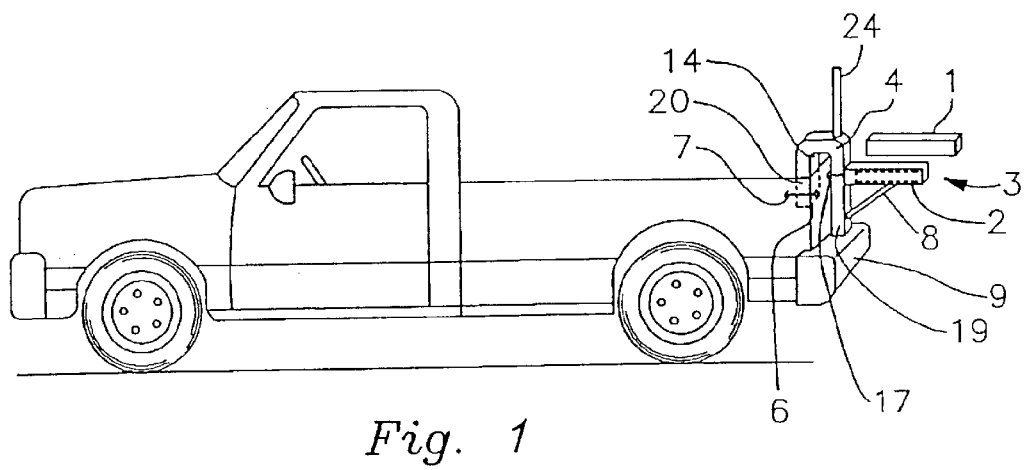
FIG. 1 is an embodiment showing the preferred embodiment in place over a truck tailgate.

A bolt 7 is used to vary the angle at which the primary support 4 sits against the vehicle by moving the primary support 4 away from the tailgate 11 as the bolt 7 is moved towards the tailgate 11. The primary support 4 is threaded so that the bolt 7 may turn through the threading to push against the tailgate 11. At the end of bolt 7 is a pad 6 which serves to cushion the bolt 7 as it presses against the tailgate 11. A locking pin 47 (which may be replaced with a bolt as shown in FIG. 1) fits though the hole 60 in the c-clamp 53 which fits around the primary support 4 and is secured to the bracket 2. The hole 18 is lined up with a primary support hole 48 at the desired height. A second locking pin 47 (or the same locking pin 47) is used to fix the position of the primary support extension 21 by passing though one of the extension holes 49 and primary support holes 18 in this embodiment.

Figure 11:
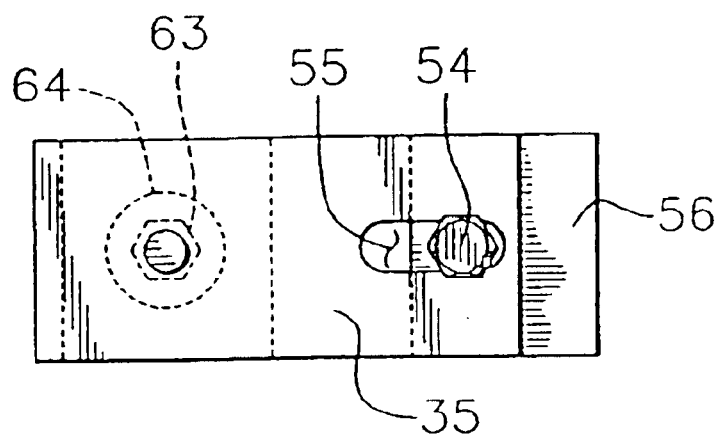
FIG. 11 is a detail view of the foot shown in FIG. 9.

At the termination point of the extension is a base plate 35. As shown in FIG. 11, the base plate 35 defines a slot 55 which serves to receive a bolt 54 which moves within the slot 55 to position L-clamp 56 which secures of the primary support to the bumper. The base plate may turn about pin 63 in either direction to secure to the front or rear of the bumper.

This shape allows the primary support 4 to rest on the bumper 9 under the tailgate of the truck to which it is mounted. Secondary leg 20 lies apart on the truck tailgate 11 from the primary support 4 Top leg 239 fits over the top of the tailgate 11 and through a hole in primary support 4 to tighten the primary support 4 and secondary leg 20 against the tailgate 11 as shown in FIG. 10. Secondary leg 20 need only be long enough to provide a surface to support the cane shaped structure thereby defined. Front scaffold hole 23 and rear scaffold hole 52 may be provided to receive scaffolding (shown as 24 in FIG. 1) as described in more detail in reference to FIG. 2.

The attached drawings show several different embodiments of the invention. In all cases it is envisioned that two separate cutting surfaces 1, preferably two by fours, will be held approximately parallel so that the combination forms a sawhorse type arrangement.

In its broadest embodiment, the invention is nothing more than a bracket 2 for holding a cutting surface 1 to an attachment surface, in the shown embodiments, a tailgate 11. It can easily be seen that the sawhorse in the various embodiments shown could mount to different locations on a vehicle, the main invention set out herein. However, by describing the specific structure (FIGS. 8 and 9), it can be seen that this specific type of bracket may fit over boards parallel to the ground and held up by nails into the frame of a house being framed. This would be desirable where, for example, it was desired to build a roof over a frame or to have a sawhorse within a frame. To accomplish this, a board is nailed parallel to the ground on studs of the frame and then the sawhorses described herein are put onto the board, just as if a tailgate was being used.

The attachment means for holding the bracket 2 is described herein in several different embodiments. In FIG. 9 it is a c-clamp 53 fitting around a primary support 4 where the c-clamp 53 is attached to the bracket 2 by a joining weld.

Figure 8:
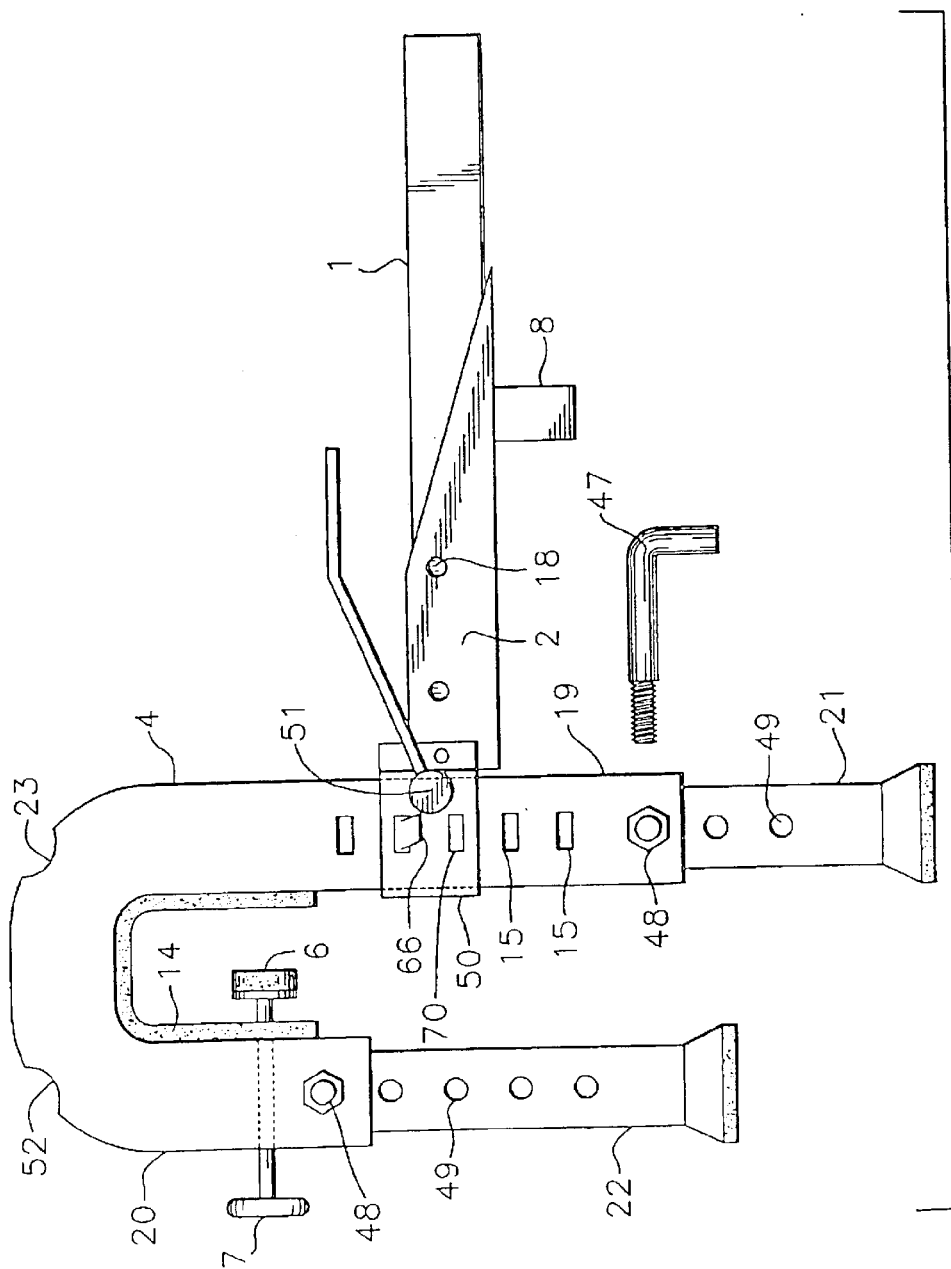
FIG. 8 shows a modification to receiving scaffolding of the embodiment in FIG. 1.

In FIG. 8, the c-clamp is replaced with a jack 50, such as that which is found on standard automobile jack. With a jack, the height of the bracket may be adjusted or the height of the bracket 2 adjusted even when fully loaded by using a lever arm 51. Here, a locking pin 47 fits through a nut 248 to secure the position of the secondary leg 20 relative to the primary support 4. The holes 15 shown in the primary support 4 are engaged by jack 50.

Also, FIG. 8 shows an embodiment where the primary, top and secondary legs are a single unit. This would be preferred where only a single sized tailgate was used. Here, the adjusting bolt 7 with pad 6 is on the secondary leg as opposed to the primary support. Pad 14 is also used in this embodiment.

The jack 50 might be replaced with other adjusting mechanisms. One example would be to have an adjusting bolt within the primary support 4 which is rotated by a handle outside of the primary support. The length of adjusting bolt would rotate and would run parallel and within the primary support length. In this way, the bracket could be mounted to an adjusting nut which was fitted onto this adjusting bolt. As the bolt was turned, the height of the bracket would vary as the nut holding the bracket moved up and down the bolt.

As can be seen, the bracket defines holes 18 through which a nail or screw may be driven to secure the cutting surface 1 with the bracket. The attachment surface shown in FIG. 1 is the tailgate 11 of a truck.

Figure 7:
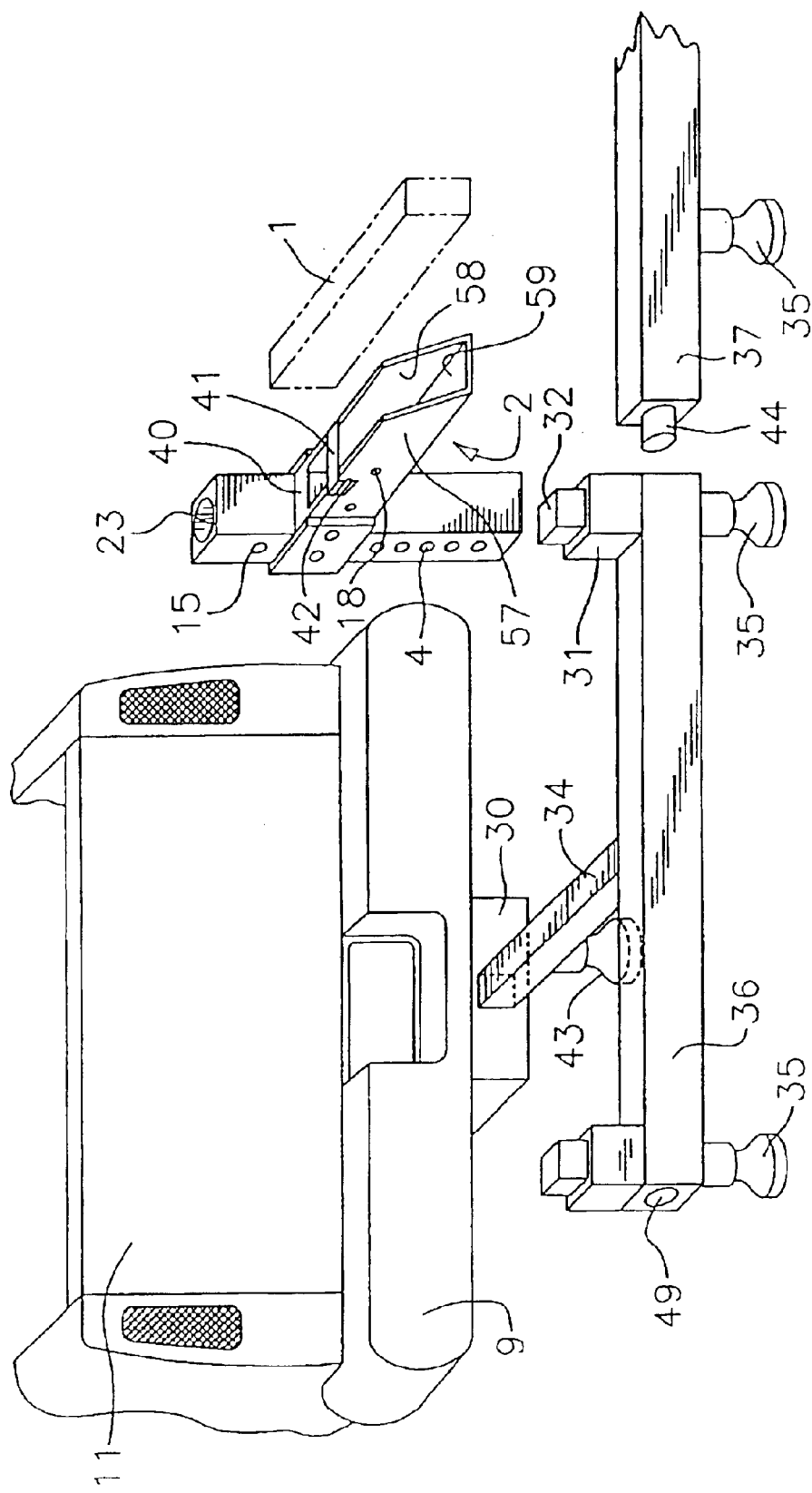
FIG. 7 is an alternate embodiment showing the receiver hitch used as a mounting surface.

FIG. 7 shows the use of a receiver hitch 30 for receiving a receiver hitch beam 34 which in turn holds t-bar 36. Support beams 31 extend upward from the t-bar 36, supported from the ground on one or more base plates 35. The primary support 4 then is attached to this support beam 31. Extension beams 37 supported by base plates 35 may be provided to lengthen the sawhorse spread between two or more primary supports 4. The extensions have extension feet 44 which may fit into extension holes 49 to extend the length and add additional primary supports 4 and their corresponding brackets 2. As can be seen in FIG. 7, the bracket 2 has a top 40, a left side 57, right side 58 and bottom 59. The forward top portion of the left side 57 and right side 58 slant down toward the bottom 59 so that progressively more of the cutting surface 1 is exposed.

The bracket 2 has one or more holes 18 into which a nail, screw or bolt may be inserted to hold the board or other cutting surface 1 in place within the bracket 2. A hinge 41 is also shown which would be an alternative or addition to the top 40.

In all of the embodiments, it is envisioned that there would be two brackets 2, having longitudinal lengths which are parallel to one another, and separated by a distance of at least two feet (60 centimeters) so as to hold two boards out from the attachment surface tailgate 11 so that the two boards (cutting surfaces 1) function essentially like a saw horse. However, this distance, between cutting surfaces (boards) 1 could vary from no more than 6 inches (15 centimeters) outward.

Figure 3:
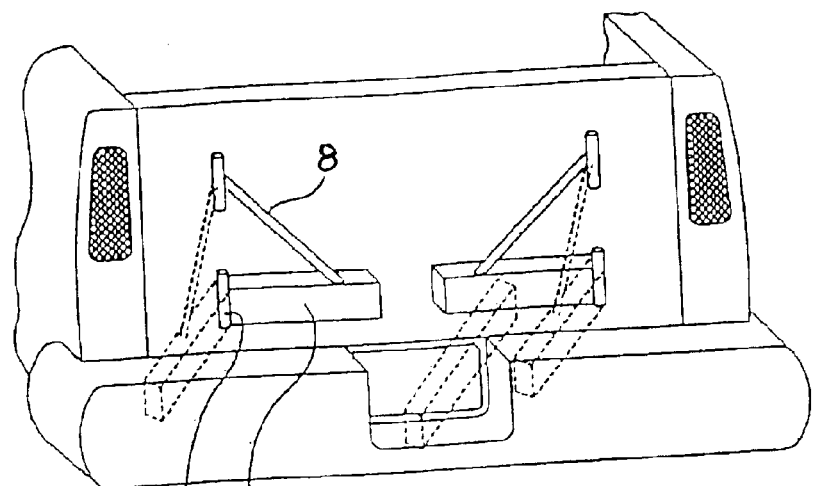
FIG. 3 is an alternate embodiment showing the saw horse built into the tailgate of a vehicle.
Figure 4:
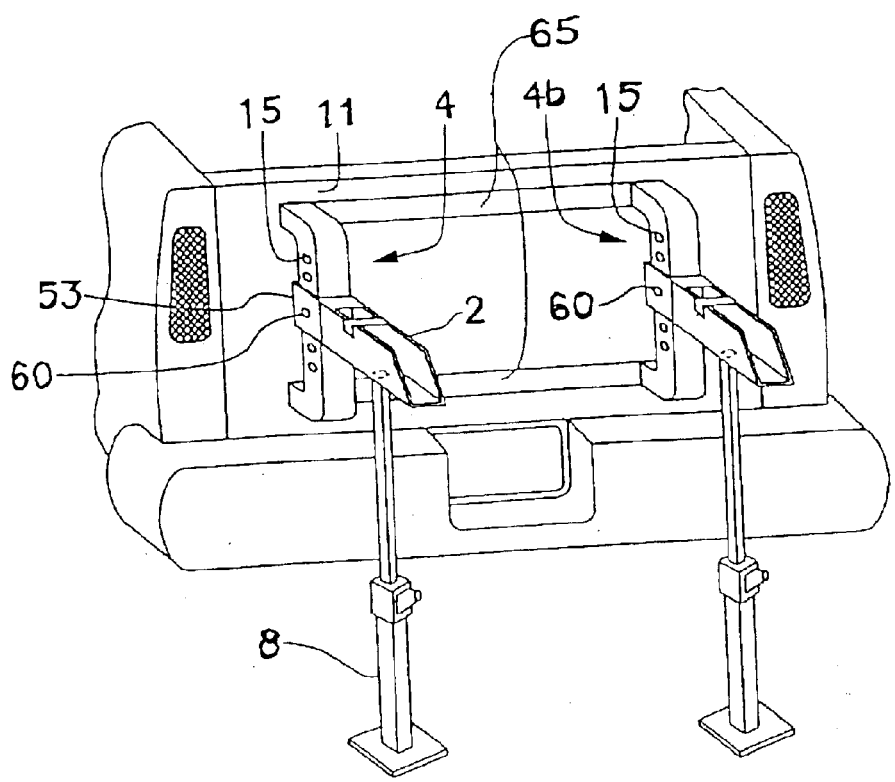
FIG. 4 is an alternate embodiment of the embodiment show in FIG. 3.
Figure 6:
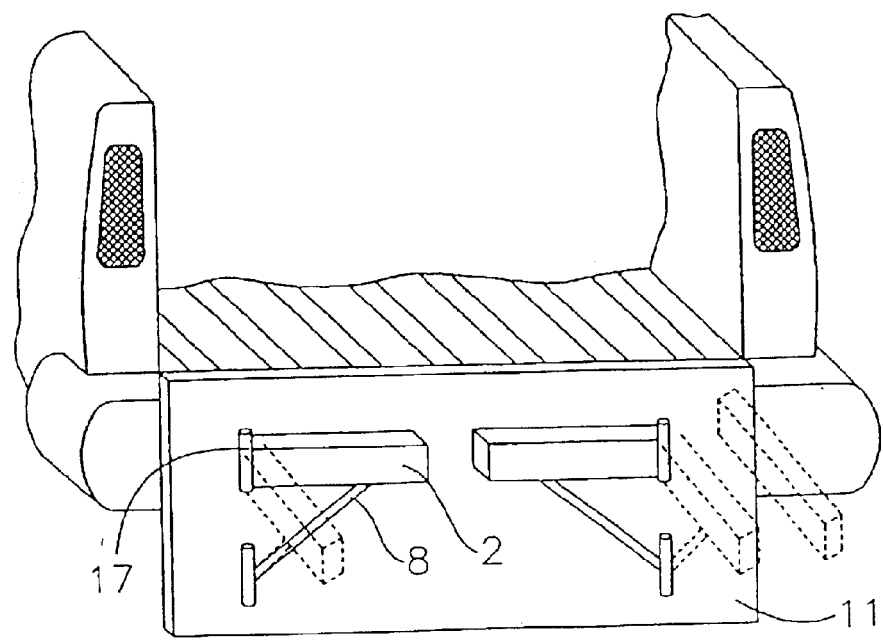
FIG. 6 is a third alternate embodiment of the embodiment shown in FIG. 3.

FIG. 1 shows another embodiment of the invention. There is a primary support 4 which holds a bracket 2, in the form of a length of channel iron having a longitudinal length. The channel iron bracket 2 defines a slot 3 into which a two-by-four or similar cutting surface 1 may be inserted. The channel iron is mounted on a cane-shaped support having a primary support 4, a top leg 239 and a secondary leg 20 which here are molded together into a single cane-shaped support. The bracket 2 has a brace 8 which may rest on the bumper 9 of the truck or against the support 4 or against the ground. The mounting of the bracket 2 to the support 4 may be by a weld or by a hinge so that it may swivel out as shown in FIGS. 3, 4 and 6. When a swivel is used, the support needs to swivel out at least 90 degrees in the preferred embodiment from the plane formed by the face of the tailgate 11.

While in FIG. 1 the secondary leg 20 merely hooks over the tailgate the secondary leg 20 may be long enough in order to reach the flat bed of the truck. As shown in FIG. 8, this could be done with a secondary leg extension 22.

The brace 8 may be made adjustable in length, so that it may brace the bracket 2. This brace may run from the bracket 2 to the primary support 4 (as shown in FIG. 1), or it may run to the bumper 9, or it may run more or less straight down to the ground (as shown in FIG. 4), to support the rear of the bracket 2 against the ground. In FIG. 4, this brace 8 is shown going to the ground. It may also rest on a wheel to allow the sawhorse to move with the truck.

This brace 8 may either be fixed or may be hinged at the point of attachment to the bracket 2 as shown in FIG. 3 and FIG. 6. It may attach to one or alternatively at all three locations set forth above.

Since the cutting surface 1 is desirable as a steady surface, some mechanism could be provided in order to hold the support 4 in place and to adjust the angle of this relative to the ground.

The simplest, example would be to have a bolt 7 push a pad 6 against the tailgate of the truck to which the device is mounted as shown in FIG. 8 or to use the brace 8 to vary the angle.

To properly fit the support 4 to the tailgate the shape of the support may correspond more closely to the surface over which it fits, so that it tightly fits in place, either with or without padding to enhance the fit. Also, the entire support top may be hinged so that the distance between the primary legs and the secondary legs can be tightened in order to draw the primary support to the secondary leg, sandwiching the truck tailgate between the two (as shown in FIG. 9). Similarly the bracket 2 could be attached by way of hinges 17 allowing the angle between the tailgate and the bracket to change. To prevent damage to the truck in either embodiment, an inner pad 14 is envisioned to cushion places where the support 4 comes in contact with the truck and where the primary support or secondary leg comes in contact with the truck or the bumper.

The invention is used as a saw horse. The brackets themselves must be made of a material which can be cut or they must provide a slot 3 or the equivalent of the slot 3, in order to mount a cutting surface 1 which is preferably a two-by-four or four-by-four, depending on the size of the sawhorse desired. The slot 3 shown in FIG. 7 has a top 40, a left side 57 and right side 58 and a bottom 59 which define the slot 3 into which the cutting surface 1 may fit. A hinge 41 is an optional part to better secure the cutting surface 1.

In the preferred embodiment, the slot 3 allows for an enclosed portion of a two-by-four cutting surface 1 of sufficient length (typically 3"–6") to be slid within the slot 3. The remainder of the two-by-four extends out of the slot 3. The two-by-four may be tightened in place utilizing a screw-type mechanism so that the boards do not slip out of the grooves. Alternatively, the slots can have sufficiently small tolerances, so that the boards (cutting surface 1) are held tightly, or the boards may be held more loosely in these slots 3. As shown in FIG. 7, one or more holes 18 in the bracket 2 may be present in order to allow for the board to be secured by way of a screw or nail or bolt which fits through the holes 18 into or onto the cutting surface 1. FIG. 1 shows a slot which is only enclosed on three sides. As can be seen, these slots are to hold boards which are less than ten inches (25.4 cm) across, although they are preferably six inches (15.24 cm) or less and greater than one inch (2.54 cm).

Figure 2:
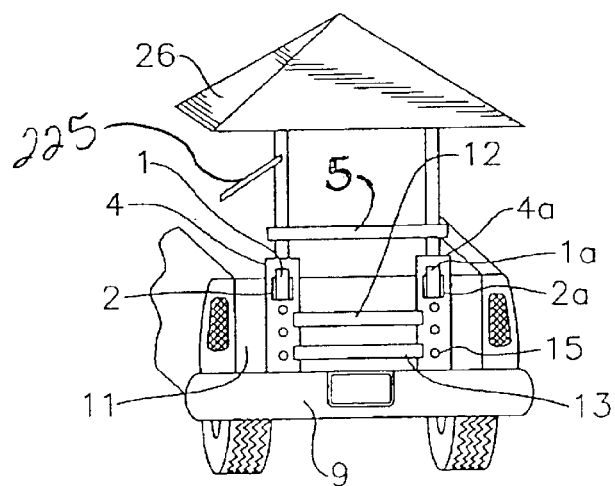
FIG. 2 is a rear view of the embodiment shown in FIG. 1.

As shown in FIG. 2, top band 12 and bottom band 13 may be attached on the left and right hold the first primary support 4 and a second primary support 4a to fix the distance from one bracket 2 to the next bracket 2a While these supports are shown on the primary legs, they may also be mounted to the top leg 239 or to the brackets 2 and 2a.

As shown in FIG. 2 a board 5 may be lowered over the cutting surfaces by brackets 2 and 2a in order to provide a table surface on which to work. The support 4 may define a scaffold hole 23 at the top into which a scaffold leg 24 may be inserted. The scaffolding provided may support various implements such as winch arm 25 and may support a shade 26 so that the work done is done out of direct sunlight. The combination of the cutting surface 1 and board 5 may be replaced with a table saw or drill or similar device. While this would be a significant departure from the inventive concept embodied herein, it is a possible use of the bracket system herein described.

As shown in FIG. 7, the bracket is modified so as to have a top portion which may be sealed at the rear with a top 40, or a hinge 41 holding a cap 42 over the top of the rear portion of the slot 3 in bracket 2 so as to better secure the cutting surface 1.

As shown in FIG. 8, support 4 or 20 may have an adjustable extension 21 and 22 respectively, in order to allow a single device to be mounted on trucks having tailgates of various sizes. This extension may a leg of variable length, mounted to the bottom leg 19 of either primary support 4 or secondary leg 20.

The primary support 4 defines a height adjustment means for varying the height of the bracket. In the preferred embodiment this adjustment means comprises a series of holes. The bracket 2 is held in place in the embodiment shown in FIG. 1 with a hinge 17. However, any height adjustment means such as a screw, hydraulic jack, mechanical jack or the like may be substituted for a bolt in one concept the bracket could be mounted to a nut which traveled on a threaded bolt which could rotate within the primary support. As the nut travels up and down this bolt, the position of the bracket changes.

There are a number of alternate methods of mounting the beam to the primary support which would include a permanent welding of the beam in place, the placement of the beam along the set of tracks such as those used in shelving or specialized tracks for this types of use. Similarly, it could be secured at three or more points by three or more bolts.

Alternatively, once the height was determined for a particular set or a particular vehicle, it could then be either welded in place or even glued in place with the proper technology.

Similarly, there could be a groove defined along the length of the primary support 4 and a securing mechanism would provide that the bolt could slide within that groove, and then be wide enough or have a washer which was wide enough to prevent it from moving completely out of the slots which would provide for a greater degree of adjustment as shown for the base plate 35 in FIG. 11.

Where an embodiment such as that shown in FIG. 6 is used, it would be preferable to have the height of the pivot 28 changeable along the truck tailgate as by having rails (FIG. 5) serving as primary supports 4 along which pivots 28 and brackets 2 move.

Once two of the supports and brackets are in place, and boards are placed within the slots in the brackets a saw horse or work surface is provided. Although these beams could be uneven;

in the preferred embodiment, they would be at the same level so as to provide an approximately flat cutting surface.

A level could be utilized in order to assure that a flat surface is provided or where the ground where the user stood was uneven, the height of the brackets could be adjusted in order to provide a surface consistent with the perspective of the user. The distance from the ground should provide an acceptable height from which to work.

Figure 5:
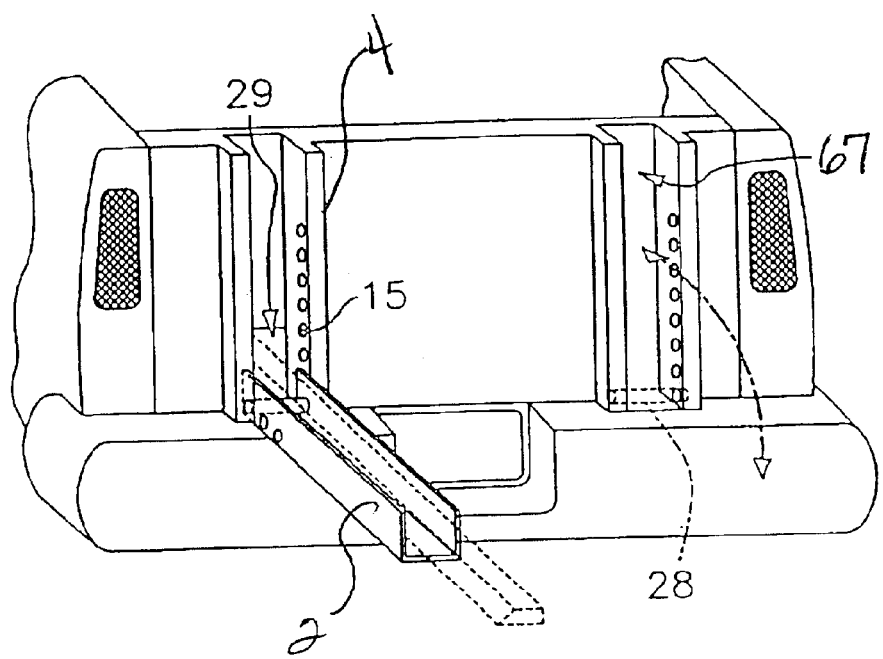
FIG. 5 is a second alternate embodiment of the embodiment shown in FIG. 3.

FIGS. 3, 4, 5 and 6 show methods of modifying the tailgate to act as the support 4 for the brackets 2 and brace 8. As shown in FIG. 5, the tailgate may provide recesses 67 into which the bracket 2 fit when not in use. As shown in FIG. 5, the brackets may be mounted on pivots 28 adjustable on support holes. The brackets 2 may swing out into place to receive a cutting surface 1, here a board.

A tailgate opening 29 is shown in FIG. 5 through which the cutting surface 1 can slide onto the truck bed. The truck bed and tailgate opening 29 can function as a bracket. As shown in FIG. 4, the brace 8 may be located below the bracket 2 and run to the ground so as not to interfere with the cutting surface.

In FIG. 4 the brackets 2 are mounted on c-clamps 53 and slide over primary supports 4 and 46, fitted through holes 15 and 60. The primary supports 4 and 46 slide within rails 65 built into the tailgate 11.

FIG. 5 shows where the brackets 2 may drop down vertically so that the bumper 9 provides the brace 8 for the bracket 2. Holes 18 secure the cutting surface 1 in the bracket slot 3. There is a tailgate opening 29 through the tail gate 11 which allows the cutting surface 1 to be moved in and out of the truck bed when the bracket 2 is lowered. This tailgate opening 29 may also hold a portion of the cutting surface 1 so that it does not fall downward when pushed down at the far end from the bracket 2. When the bracket 2 is folded into the tail gate 1, the tailgate openings 29 are shut off.

While the invention is primarily designed for use with a vehicle having a tailgate 11, it can be seen that the attachment surface shown as the tailgate 11 could easily be a modified side panel or front panel of the vehicle.

In order to lower the level of the cutting surface further, FIG. 6 shows how a tail gate may have the cutting surface on the inside face. In this embodiment, the tail gate would have to be constructed so as to fold down below the bumper. This could be done by modifying the construction of the bumper or by adding a second tailgate containing the invention behind the primary tailgate so that this mechanism would function properly.

The embodiment shown in FIG. 7 allows for the bracket means to be mounted onto the receiver hitch 30. Here the bracket 2 is brought out onto an extended system supports holding primary supports for larger projects using the vehicle as a ready anchor. A similar hitch mounted to the front of the vehicle could also be used. In FIG. 7, the tailgate is not affected. Instead the bracket 2 is mounted by way of the receiver hitch 30 below the bumper. The primary support 4 is mounted on a support beam 31 by way of a joining means which here comprises a hole 33 in the bottom of the support 4 into which a post 32 in the support beam 31 is inserted. The support beam 31 has a base plate 35 much like the brace 8. The support beam is attached to a receiver hitch beam 34 by way of a t-bar 36. This provides for greater spacing between the two brackets 2. The length of the t bar, and the ability to provide for more brackets 2 is provided by having extension beams 37 which may have top leg 239 which may be inserted into beam holes 38 in the t bar 36 or in other extension beams to form a matrix of support beams and corresponding brackets 2. Since these support beams 21 may have scaffolding holes 23, a matrix for scaffolding is also provided.

There is a receiver hitch beam 43 which can be used to keep the sawhorse brackets 2 in place after the vehicle is used. There may also be extension feet 44 to support the extensions 37 which may be used to extend the length of the t-bar 36. The t-bar 36 as shown runs in either direction from the receiver hitch beam 34. It may run in only one direction from the receiver hitch, either left, right or back. The only requirement is that either the receiver hitch beam 34 itself or the t-bar 36 hold at least two supports 4 so that a saw horse arrangement is possible.

FIG. 8 shows a close up of an alternative support/bracket arrangement shown in FIG. 1. In FIG. 8, at various locations, the holes 15 and 60 are rectangular and corresponding latches 60 are attached to the side (although they could be on the back or bottom) of the bracket 2 so that the beam latches 60 use the side of the brackets 2 and the weight of the brackets 2 to hold the bracket latched in place. Traditional car jacks function in this same fashion. Any jack-type arrangement, such as a hydraulic jack or a car-type jack could be utilized in order to raise and lower the height of the bracket 2 to provide greater adjustment and to allow the level of the beams to be moved with less effort. A locking pin 47 through a nut 248 in the primary support 4 and secondary leg 20 pass into holes 49 in the extensions 21 and 22 to adjust the height. A jack 50 is used to adjust the height as with a standard jack used on an automobile using a lever arm 51. A secondary scaffold hole 52 is available to allow square scaffolds to be erected in conjunction with scaffold hold 23.

All of the embodiments shown hold the cutting surface of the board at approximately 90 degrees to the closed tailgate 11. However, a lesser angle might be utilized and still accomplish the desired result. This angle would preferably be from 30 degrees to 90 degrees. Similarly a single bracket might be used instead of two as long as a space for cutting was formed, although this would result in a significantly different invention. In the present embodiments, the ability to alter the spacing of the two cutting surfaces is a significant improvement.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

I CLAIM:

1. A device for holding a cuttable item to be worked on and for mounting a tool having a blade and for supporting the cuttable item said device being attachable to a vehicle resting on the ground, said vehicle having an interior a vehicle frame having a left panel and right panel with a top and bottom comprising:

(1) a central frame having a left side and a right side, a top and a bottom and inside and outside defining a central frame opening said central frame inside defining a frame surface for holding material and said central frame further defining a tool holding means for holding the tool and wherein the central frame is rotationally attached at the left side at the bottom and right side at the bottom to the vehicle between the left panel and right panel so it may be lowered outward from the left side and right side with the outside facing the ground, a leveling means for leveling the central frame and wherein the leveling means further comprising at least one leg having a variable length attached to the central frame and wherein the leveling means further comprises at least second leg attached to the central frame having a variable length and wherein the at least one leg further comprises a device for holding a first cutting surface defining an enclosed portion and an exposed portion, and said device also for holding a second cutting surface defining an enclosed portion and an exposed portion, each of said first and second cutting surfaces having a top surface, a length and a width with said first and second cutting surface being held by said device so that the first and second cutting surface are approximately parallel and above a standing surface, said device comprising:

(A) a first bracket means defining a first slot for receiving the first cutting surface enclosed portion so that the first cutting surface exposed portion extends outward and away from the vehicle interior and a second slot for receiving the second cutting surface enclosed portion so that the second cutting surface exposed portion extends outward and away from the vehicle interior approximately parallel to, but separated from said first cutting surface.

2. The invention of claim 1 wherein at least one of the first cutting surface further comprises a wooden board having a top surface and an enclosed portion fitting within the slot and wherein the exposed portion further comprises at least a part of the board top surface.

3. The device of claim 2 wherein the height of the first bracket means is adjustable.

* * * * *